(No Model.)  2 Sheets—Sheet 1.

J. A. LANE.
AXLE LUBRICATOR.

No. 316,046.  Patented Apr. 21, 1885.

WITNESSES  INVENTOR
L. C. Suichant.  John A. Lane.
L. H. Bateman.

(No Model.) 2 Sheets—Sheet 2.

J. A. LANE.
AXLE LUBRICATOR.

No. 316,046. Patented Apr. 21, 1885.

WITNESSES
George C Davis
L H Bateman

INVENTOR
John A. Lane

UNITED STATES PATENT OFFICE.

JOHN A. LANE, OF BOSTON, MASSACHUSETTS.

AXLE-LUBRICATOR.

SPECIFICATION forming part of Letters Patent No. 316,046, dated April 21, 1885.

Application filed February 8, 1884. (No model.)

*To all whom it may concern:*

Be it known that I, JOHN A. LANE, a citizen of the United States, residing at East Boston, in Suffolk county and Commonwealth of Massachusetts, have invented a new and useful Lubricating Device, of which the following is a specification.

My invention relates to improvements in lubricating devices which, according as the particular use may require, can be attached to the box of a revolving shaft or to the hub of a revolving wheel; and it consists in a cup-shaped reservoir for lubricating material having a single opening which serves for the purpose of filling the reservoir and for the outlet therefrom for the lubricating material.

The objects of my invention are, first, to provide a reservoir for a continuous supply of lubricating material to the bearings of a revolving shaft or wheel; second, to afford means for lubricating the said bearings without opening or removing the box; and, third, to provide a reservoir for lubricating material that will be equally adapted to the use of liquid oil with suitable packing and to the use of thickened lubricating substances.

In the accompanying drawings my invention is shown as applied to the hub of a vehicle-wheel, to which it will be at once observed to be especially applicable for the reasons that it may be so set into the hub as not to project therefrom in an objectionable way, the wheel-bearings may be continuously supplied with lubricating material, the reservoir may be properly and conveniently filled without disturbing the wheel, and the use of a lifting-jack is not required when it is necessary to grease the wheels.

Figure 1:
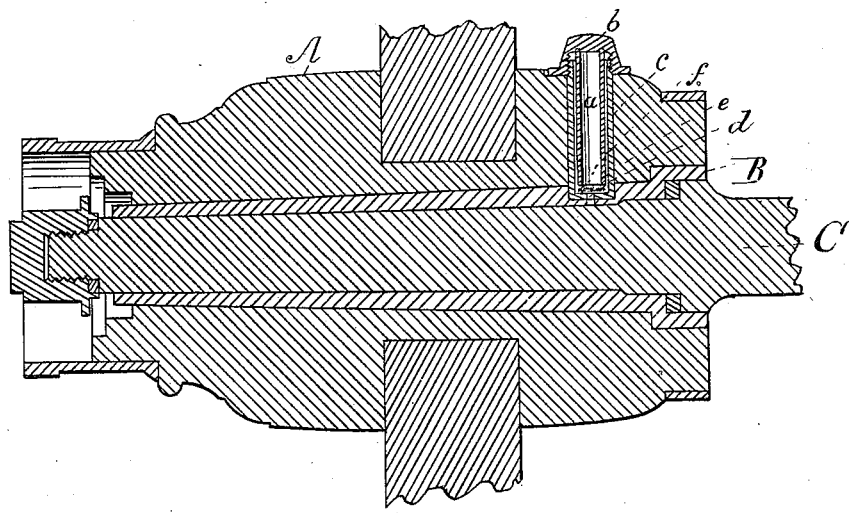
Figures 2, 3:
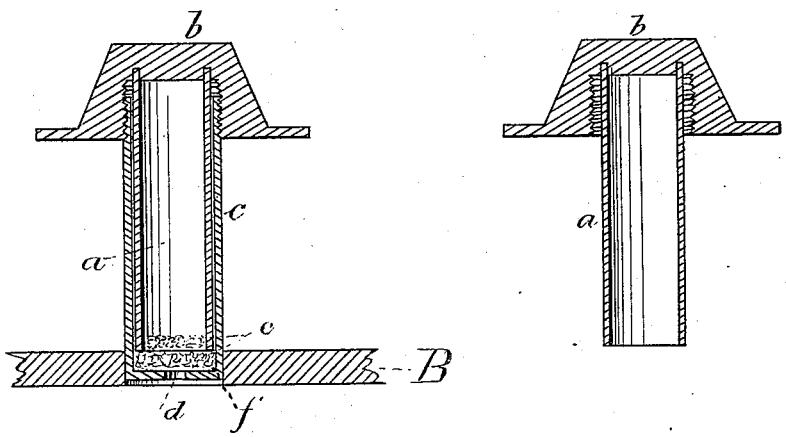

Figure 1 is a vertical section of the hub A, box B, and shaft C, of a vehicle-wheel, and my invention as attached is shown therewith, and also in Fig. 2, in vertical section.

In Fig. 2 the drawing is enlarged to more clearly show the arrangement and relation of parts of my device, in which *a* is a reservoir for lubricating material and is tightly attached, as shown, to the securing-cap *b*, which securing-cap is provided with suitable means for fastening the same to the outer casing, *c*, which incloses the reservoir. *d* is an orifice of suitable size for the passage of the lubricating material to the bearing parts. The shoulder formed in the outer casing at *f* prevents the packing *e* or the thickened lubricating material in the reservoir from resting upon the shaft.

Fig. 3 is a detached view of the reservoir and cap.

The form of the reservoir *a* (shown in vertical section in the drawings) is a cylindrical tube, preferably of metal, the sides and top of which are tight. The vent shown at *g*, Fig. 4, if used at all, should not be so large as to prevent the reservoir being tight as to its sides and top for the material it is intended to contain, and it is not an essential feature in my device.

The particular use of the outer casing or sleeve, *c*, is to provide means for holding and securing the reservoir *a*, and also, as in the case of the application of this device to the wooden hub of a vehicle-wheel, it may serve to protect the wood against the action of the oil and from wearing by use. When the box B is of sufficient thickness, it may be used as a part of the outer casing and for the purpose of securing the reservoir *a*, as shown in the modification of my invention, Fig. 4, drawn in vertical section and showing a fragment of the hub A and box B, wherein the box is tapped partly through with a screw-tap, leaving enough of the box to form the shoulder *f* and orifice *d*, and the reservoir is provided with a screw at its lower end corresponding to and fitting into the tap so made.

Figure 4:
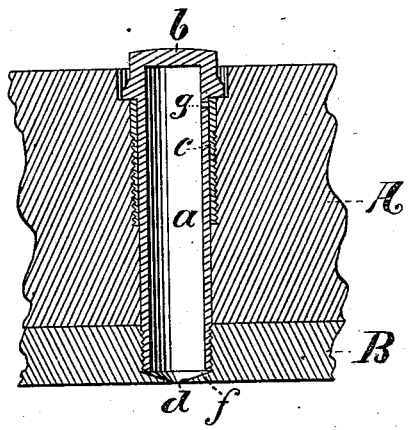

If it should be deemed necessary either for the purpose of more readily filling the reservoir with thickened lubricating material or to insure a more fluent supply to the bearing parts, a vent-hole, as shown at *g*, Fig. 4, may be pierced in the reservoir.

I do not limit myself to a screw as means for securing the reservoir in its place.

The application of my invention to the box of a revolving shaft does not materially differ from its application to a vehicle-wheel, as shown.

When the reservoir requires filling, the simple operation of filling it is, unscrew the cap and with it pull out the reservoir, and if it is desired to fill it with oil pour the oil therein and then put in a little cotton waste or other suitable packing, or if hardened grease is used fill the reservoir therewith and then screw it back into the casing. Much trouble as well as unnecessary waste of lubricating material will thereby be prevented.

I claim and desire to secure by Letters Patent—

1. A lubricator consisting of an outer casing open and exteriorly threaded at its upper end and having a perforation at its lower end, in combination with a cap, b, having a tube, a, substantially as set forth.

2. A lubricator consisting of an outer casing open and threaded exteriorly at its upper end, in combination with a cap, b, having a tube, a, and a packing located in the lower end of said outer casing, substantially as set forth.

JOHN A. LANE.

Witnesses:
L. H. BATEMAN,
GEO. C. DAVIS.